Figure 1:
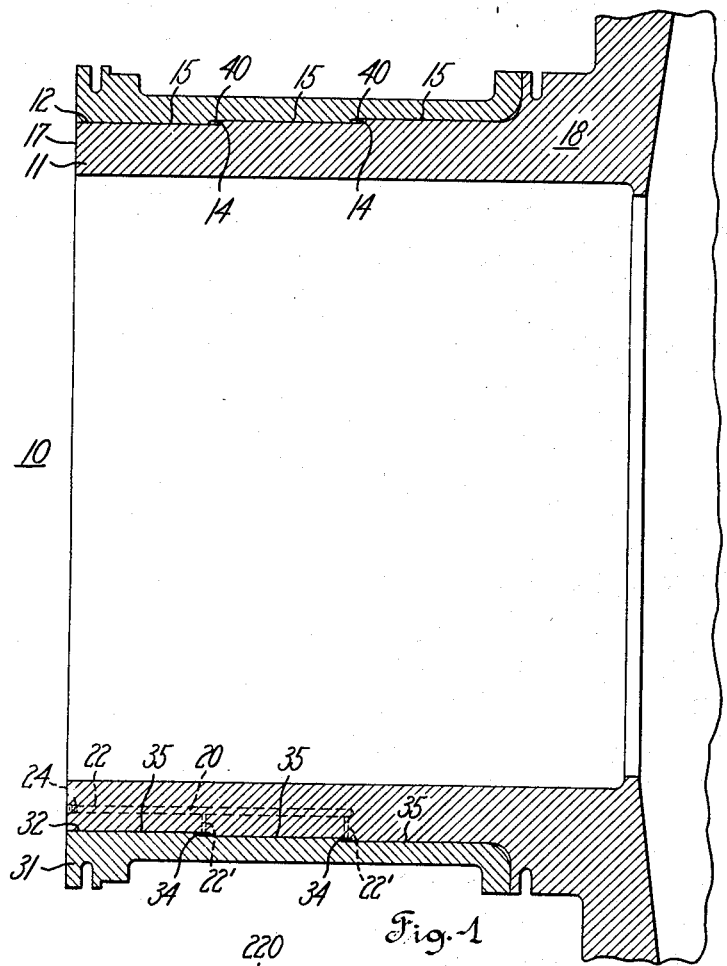

July 26, 1960

R. C. JENNESS 2,946,610

ASSEMBLY HAVING FLUID PRESSURE MEANS FOR
THE REMOVAL OF TIGHTLY FITTED PARTS
Filed Aug. 30, 1957

Inventor
Raymond C. Jenness
By Arthur M. Streich
Attorney

United States Patent Office 2,946,610
Patented July 26, 1960

2,946,610

ASSEMBLY HAVING FLUID PRESSURE MEANS FOR THE REMOVAL OF TIGHTLY FITTED PARTS

Raymond C. Jenness, West Allis, Wis., assignor to Allis-Chalmers Manufacturing Company, Milwaukee, Wis.

Filed Aug. 30, 1957, Ser. No. 681,327

4 Claims. (Cl. 287—52)

This invention relates in general to assemblies of tightly fitted parts and more specifically to fluid pressure disengagement of the assembled parts.

In tightly fitted assemblies having one member, for example a sleeve or liner, fitted to another member by heating one member to cause it to expand and then cooling it to tightly grasp the other member, it is often very difficult to separate the two members. Separation may be required for maintenance, for example, when one of the members has become worn and must be replaced. Many attempts have been made in the past to devise aids for the removal of the respective members of a tightly fitted assembly. Pneumatic tools as well as various hydraulic arrangements have been employed to force the separation of such members.

One hydraulic arrangement well known in the prior art has been to provide one member with a tapered bore, and the other member with a frusto-conical surface, thereby providing an interference fit. Fluid pressure is delivered to the space between the tapered bore and the frusto-conical surface to force the members apart. This arrangement has the disadvantage that having tapered surfaces in contact and held together by compressive forces of a shrunk fit, such forces have a component in an axial direction of the taper that tends to part the members and defeat the purpose of the tight fit, for a smaller additional force will part the members and they may come apart when it is not desired that they do so. For this reason a lock nut or other retaining means is necessary in this assembly, so that accidental removal of the sleeve from the frusto-conical surface cannot occur.

Other assemblies have provided for separation by hydraulic pressure of one member from another that do not employ tapered surfaces. These arrangements have axially parallel mating surfaces between the companion members. Fluid pressure is delivered through a passage to force its way between the mating surfaces and cancel out the forces applied because of a shrunk fit engagement. To be effective this fluid pressure must be delivered to approximately the axial midportion of the mating surface. However, as soon as the members have been one-half separated, the fluid pressure passage opens to atmosphere and pressure tending to help separation of the members is no longer available. Hence, these arrangements do not completely separate the members but require some other mechanical means for completing the separation of the respective parts of the assembly.

An assembly of a pair of members, according to this invention, overcomes the problems confronted by the aforementioned fitted assemblies by calling for one member having an external surface provided with a step design dividing the external surface into at least two portions of progressively larger diameters; the other member having an internal surface provided with at least a number of steps dividing the internal surface into portions of progressively smaller diameter, with the steps and portions corresponding in number to the steps and portions in the external surface of its companion member. One member is assembled in an axial position relative to the other member to define a space between the radial face portions of the steps on the respective internal and external surfaces. The contacting portions of the internal and external surfaces defined by the steps are all of equal axial length. An opening is provided in one of the members to define a fluid passage from the exterior of the assembly to each of the spaces. Fluid pressure is supplied through the opening to the spaces and sufficient pressure can be applied to move one member relative to the other member. Since the contacting portions of the internal and external surfaces are of equal axial lengths none of the spaces between steps will open to the atmosphere until all of the mating surfaces have parted and complete separation by hydraulic pressure is effectuated. No lock nut or other retaining means is required to assure the retention and position of one member with respect to the other member from being accidentally removed.

Therefore, it is an object of this invention to provide in a tightly fitted assembly a new and improved structure for disengaging the respective members of the fitted assembly by fluid pressure, in such a manner that no additional mechanical force is required to complete the disengagement.

Another object of this invention is to provide a tightly fitted assembly having a new and improved configuration of the contacting surfaces that does not require retaining means to prevent the accidental removal or separation of the respective members.

It is a further object of this invention to provide a new and improved assembly that can be fitted together tightly enough to meet operational requirements of the assembly, and is specifically designed to assist in the disengagement of the members of the assembly when necessary because of maintenance requirements.

Figure 2:
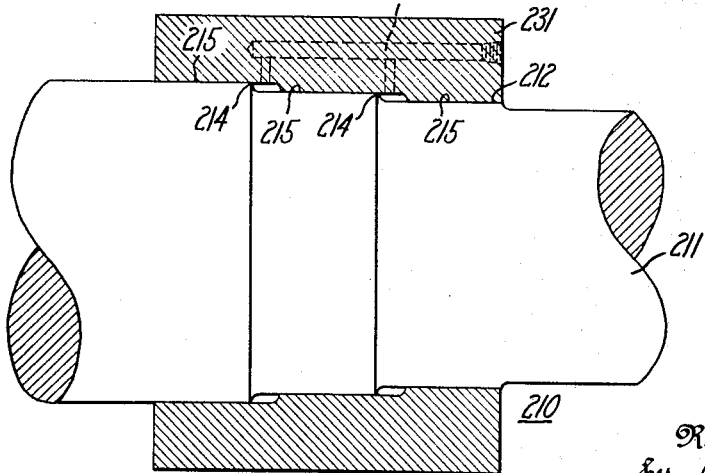

The construction and operation of the invention and how the above objects are accomplished will appear from this specification and the accompanying drawings showing two embodiments of the invention, in which:

Fig. 1 is a longitudinal section of the invention applied to a trunnion sleeve assembly having a fluid passage within the trunnion; and Fig. 2 is a longitudinal section of the invention applied to a shaft bearing assembly showing a fluid passage within the bearing.

Referring to Fig. 1, it will be seen that the assembly 10 chosen to illustrate the present invention comprises generally a trunnion 11 having an external surface 12 provided with a plurality of steps 14, dividing the external surface 12 into a plurality of portions 15 of different diameters. The diameters of the portions 15 beginning from the outer end 17 of the trunnion to the inner end 18, increase with each successive step.

A sleeve 31 is fitted over the trunnion 11. The sleeve has an internal surface 32 that is provided with a plurality of steps 34 dividing the internal surface into portions 35 corresponding in number and of the same increasing diametrical construction to match steps 14 and portions 15 of the external surface of the trunnion 11; so that the corresponding and respective portions 15 and 35 of the internal and external surfaces are in tightly fitted contact relationship to one another. The inner diameters of the sleeve portions 35 are slightly less than the outer diameters of the trunnion portions 15; and the sleeve 31 may be mounted by heating it, to cause it to expand sufficiently so it may be assembled onto the trunnion 11. The sleeve is then allowed to cool and contract around the trunnion, fixing it securely in position.

When the sleeve 31 is placed in assembled position relative to the trunnion 11, a space 40 is defined between the steps 14 and 34 on the respective internal and external surfaces. The contacting portions of the internal surface 32 as well as the corresponding contacting portions of the external surface 12 are all specifically designed so that their axial lengths are equal. By having the contacting portions of the surfaces of equal axial length, on removal of the sleeve 31 from the trunnion 11, the inner end adjacent to each step 34 of each portion 35 of the sleeve having the same diametrical relationship with the corresponding portion 15 of the trunnion 11 will come in contact with each step 14 of the corresponding portion of the trunnion thereby affording complete removal of the sleeve from the trunnion.

A fluid passage 20 is provided for delivering fluid pressure to the spaces 40 which in the embodiment of Fig. 1 is a bore 22 extending longitudinally within the trunnion 11. Other bores 22' are provided from the external surface 12 and adjacent the steps 14 of the trunnion, to the bore 22 extending longitudinally within the trunnion. A threaded tap is provided in the outer end 17 of the trunnion, leading to the bore 22. Therefore, the fluid passage 20 is defined from the exterior of the assembly 10 to the spaces 40 between the steps 14 and 34 of the assembled trunnion and sleeve; the threaded tap 24 will accommodate connecting means from a fluid pressure source, not shown.

An illustration of the invention applied to a solid shaft and sleeve bearing assembly 210 is shown in Fig. 2. In this embodiment a solid shaft 211 having an external surface 212 is provided with a number of steps 214 dividing the external surface 212 into a number of portions 215 in a manner similar to that shown in Fig. 1. In this embodiment, however, the fluid passage 220 is located in the sleeve bearing 231.

In either of the illustrations of the invention the tightly fitted assembly must have at least one step dividing the external surfaces of the trunnion or shaft into at least two portions. With respect to the internal surface of the sleeve member, it must be provided with at least a number of steps dividing the internal surface into portions corresponding in number to the steps and portions of the external surface. The importance of having the specific design in which the diameters of the portions of the respective corresponding surfaces are increasing with each successive step, as well as having the contacting portions of equal axial length throughout the assembly will be apparent from a full disclosure of the operation involved in the removal of the sleeve member from the cylindrical member. It is seen, however, that the location of the fluid passage in communication with the spaces defined by the respective steps of the external and internal surfaces may be located in either the cylindrical member or the sleeve.

In operation, referring to Fig. 1, a fluid under pressure is supplied by a pump, not shown, connected to the threaded tap 24 leading to the bore 22. The pressurized fluid passes through the bore within the trunnion 1, into the spaces 40 that are defined between the respective steps 34 and 14 of the internal and external surfaces of the sleeve and trunnion. The contacting portions of the internal surface 32, as well as those of the external surface 12 intermediate and on the ends of the respective steps, as previously mentioned, are of equal axial length throughout. The defined spaces 40 of the assembly 10 may also be of equal axial length depending upon the construction of the assembly involved. However, the contacting portions must always be equal in axial length. As the fluid pressure is supplied to the spaces 40, it will exert pressures in all directions; that is, pressures in both axial directions, against the steps 14 in the external surface 12 of the trunnion, as well as against the steps 34 on the internal surface 32 of the sleeve, and in a radial direction expanding the sleeve 31 and contracting the trunnion 11.

The pressure within the spaces 40 causes the sleeve 31 to move relative to the trunnion 11 increasing the axial length of the space 40 between the steps 34 and 14 of the internal and external surfaces, respectively, and decreasing the axial length of the contacting portions 15 and 35 until the operation of removal is complete. Because of the step design feature, in removing the sleeve 31 from the trunnion 11, the spaces 40 as they increase in axial length throughout movement of the sleeve, the contacting portions 15 and 35 as they decrease in axial length will remain equal throughout movement of the sleeve so that on separation of the assembly the corresponding fitted portions of the assembly are effected simultaneously. The step design feature aids in the complete removal of the sleeve from the trunnion by the sole use of the fluid pressure, and no additional mechanical means is required.

Although the invention is shown and described with particular reference to a trunnion sleeve assembly as well as a shaft bearing assembly, it is equally adaptable for use with any fitted assembly that requires the separation of the respective members of the assembly. And it should therefore be understood that it is not intended to limit the invention to the exact construction and arrangement of the parts described herein, as various modifications within the scope of the appended claims may occur to those skilled in the art.

What is claimed is:

1. An assembly comprising a cylindrical member having an external surface provided with a multiple of steps dividing said external surface into a plurality of coaxial integral portions having sequentially increasing diameters; a sleeve member having an internal surface defining a cavity extending axially and entirely through said sleeve, said internal surface provided with a multiple of steps dividing said internal surface into a plurality of coaxial portions having sequentially increasing diameters, said portions corresponding in number and sequence to said portions in said external surface, said steps corresponding in number and relative position to said steps in said external surface, said sleeve member being tightly fitted over said cylindrical member with said corresponding portions of said respective surfaces making contact therebetween; said sleeve member being positioned on and axially offset relative to said cylindrical member with said steps on said respective members being positioned adjacent each other and defining like axially expansible chambers therebetween; and an opening in one of said members defining a fluid passage to said chambers for introducing pressure fluid simultaneously into said chambers to axially expand said chambers and thereby move one of said members relative to the other of said members.

2. An assembly for disengaging tightly fitted members comprising a cylindrical member having an external surface provided with at least one step circumferentially disposed thereabout and dividing said external surface into at least two integral portions, each having a preselected axial length; a sleeve member circumscribing said external surface in tightly fitted engagement therewith and having an internal surface complementary thereto, said internal surface being provided with at least one step adjacent each corresponding step on said cylindrical member and dividing said internal surface into at least two integral portions corresponding to said portions in said external surface, said portions of said sleeve member each having an axial length equal to said preselected axial length of said corresponding portion of said cylindrical member, said portions of said cylindrical member and said corresponding portions of said sleeve member being in axially offset engaging relationship with each other and defining therebetween, at each of said steps, an axially expansible chamber; and an opening in one of said members defining a fluid passage to said axially expansible chamber for introducing fluid pressure into said chamber to thereby axially expand said chamber and move said sleeve member relative to said cylindrical member.

3. An assembly comprising: a cylindrical member having a stepped external surface provided with a first portion of maximum diameter, a second portion of lesser diameter, a third portion of still smaller diameter and a fourth portion of minimum diameter, said first and second portions, said second and third portions, and said third and fourth portions being respectively joined by first, second and third annular shoulders; an annular sleeve member having an internal surface defining a stepped cylindrical bore, said bore including a first portion of maximum diameter, a second portion of lesser diameter and a third portion of minimum diameter, said first and second, and said second and third portions being respectively joined by first and second annular shoulders, said sleeve member further having outboard of said portions, first and second end surfaces respectively confining, along with said first and second annular shoulders, said first and said third portions, respectively therebetween, said cylindrical member being tightly secured in said sleeve member with said third annular shoulder of said cylindrical member in the plane of said second end surface of said sleeve member and said first, second and third portions of said cylindrical member and said sleeve member being respectively in partial tight fitting engagement with each other so that said first and said second annular shoulders of said cylindrical member respectively are adjacent said first and said second annular shoulders of said sleeve member to define first and second totally enclosed axially expansible chambers intermediate opposed portions of said external surface and said internal surface, said first chamber being bounded by and intermediate of said second portion of said cylindrical member and said first portion of said sleeve member, said second chamber being bounded by and intermediate of said third portion of said cylindrical member and said second portion of said sleeve member; said second and third portions of said cylindrical member and said first and second portions of said sleeve member being of equal preselected axial length and said third portion of said sleeve member having an axial length equal to said preselected axial length less the axial length of said chambers when said third annular shoulder of said cylindrical member enters said plane of said second end surface of said sleeve member; and fluid passage means defined in one of said members and connected with said chambers for introducing fluid pressure into said chambers to axially expand said chambers to move said members axially relative to each other while simultaneously maintaining the totally enclosed axially expansible characteristic of said chambers until said members become disengaged from each other.

4. An assembly comprising: a cylindrical member having an external surface provided with a plurality of integral portions and annular steps consecutively juxtaposed with each other and having sequentially diminishing diametric dimensions; an annular sleeve member having an internal surface defining a cylindrical bore extending axially therethrough and having a plurality of integral portions and annular steps complementary in position and diametric dimension to said portions of said cylindrical member, said cylindrical member being tightly secured in said sleeve member with said portions thereof partially engaged with said complementary portions of said bore, said portions and steps of said cylindrical member and said complementary portions and steps of said bore adjacent said steps of said cylindrical member defining therebetween a plurality of identical annular totally enclosed axially expansible chambers; and fluid passage means axially disposed in one of said members and connected with said chambers for introducing fluid pressure into said chambers to axially expand said chambers to move said members axially relative to each other while simultaneously maintaining the totally enclosed annular characteristic of said chambers until said members become disengaged from each other.

References Cited in the file of this patent

UNITED STATES PATENTS

| | | |
|---|---|---|
| 376,900 | Morell | Jan. 24, 1888 |
| 961,375 | Seabrook | June 14, 1910 |
| 2,084,439 | Hamer | June 22, 1937 |
| 2,348,293 | Hamer | May 9, 1944 |
| 2,764,437 | Bratt | Sept. 25, 1956 |
| 2,817,142 | Boden et al. | Dec. 24, 1957 |
| 2,832,653 | Wilson | Apr. 29, 1958 |